United States Patent [19]

Kuragano et al.

[11] Patent Number: 5,626,396
[45] Date of Patent: May 6, 1997

[54] FRAME STRUCTURE OF SEAT

[75] Inventors: Kentarou Kuragano; Hirotoshi Kojo, both of Yokohama, Japan

[73] Assignee: Ikeda Bussan Co., Ltd., Ayase, Japan

[21] Appl. No.: 597,797

[22] Filed: Feb. 7, 1996

[30] Foreign Application Priority Data

Feb. 13, 1995 [JP] Japan .................... 7-047812

[51] Int. Cl.$^6$ .................................. A47C 7/02
[52] U.S. Cl. ........................... 297/452.2; 297/391
[58] Field of Search .................... 297/410, 391, 297/452.1, 452.2, 452.18

[56] References Cited

U.S. PATENT DOCUMENTS

| | | | |
|---|---|---|---|
| 4,519,650 | 5/1985 | Terada et al. | 297/452.18 |
| 5,397,170 | 3/1995 | Shrock | 297/452.18 |

FOREIGN PATENT DOCUMENTS

| | | |
|---|---|---|
| 0088433 | 9/1983 | European Pat. Off. . |
| 0233822 | 8/1987 | European Pat. Off. . |
| 233822 | 8/1987 | European Pat. Off. .......... 297/452.18 |
| 1377666 | 12/1974 | United Kingdom . |
| 2222520 | 3/1990 | United Kingdom . |

*Primary Examiner*—Milton Nelson, Jr.
*Attorney, Agent, or Firm*—Foley & Lardner

[57] ABSTRACT

A back-rest frame structure for a vehicular seat comprising a generally U-shaped frame that includes an upper frame section. The upper frame section has a generally channel-shaped section and includes an upper end wall portion formed with through-holes for receiving holders for stays of a head rest. First and second side frame sections are integrally connected respectively to the opposite end portions of the upper frame section. The generally U-shaped frame is produced from a metal sheet as a one-piece structure. A support bracket is fixed to the upper frame section and adapted to support the holders for the head rest stays. The support bracket includes a support section for supporting the holders, located opposite to the upper end wall portion of the upper frame section of the frame. The support section is formed with through-holes facing those of the upper end wall portion of the upper frame section so as to respectively receive the holders.

3 Claims, 8 Drawing Sheets

FRAME STRUCTURE OF SEAT

BACKGROUND OF THE INVENTION

1. Field of the Invention

This invention relates to improvements in a frame structure of a seat, and more particularly to a back-rest frame structure of a vehicular seat, which structure includes a generally U-shaped (inverted) frame formed integrally of a sheet material.

2. Description of the Prior Art

In general, a back-rest frame of a vehicular seat is required to stably sustain a vehicle occupant seated on a vehicular seat, to allow the vehicle occupant to be comfortable to sit in, and to have a sufficient strength during a vehicle cruising. In view of this, the back-rest frame is usually produced by joining an upper frame section and right and left side frame sections by spot welding or the like. The upper frame section and the side frame sections are formed separate from each other. Additionally, a variety of propositions have been made to integrally form the back-rest frame as a one-piece structure, including the upper frame section and the side frame sections. With such back-rest frame structures, a head rest has been usually installed to the back-rest frame structures in the following manner: A holder bracket is fixed to the upper frame section to support holders for stays of a head rest. The head rest stays connected to a head rest frame of the head rest are inserted into the holders, so that the head rest is securely mounted on the back-rest of the vehicular seat.

However, drawbacks have been encountered in the above-discussed conventional back-rest frame structures, as discussed below. That is, in the case where the back-rest frame structure is formed by joining the separate frame members, the number of component parts, the weight and the production cost of the frame structure are increased while increasing production time for the frame structure. In the case where the upper frame section and side frame sections are formed integral as a one-piece structure, an over-quality in strength is made partially in the frame structure while increasing the weight of the frame structure. Additionally, the holder bracket is usually fixed to the upper frame section by means of welding or the like, and therefore the number of component parts, the weight and the production cost of the frame structure has been unavoidably increased while rendering an assembly operation of the frame structure troublesome.

SUMMARY OF THE INVENTION

It is an object of the present invention to provide an improved frame structure of a seat, which can effectively overcome the drawbacks encountered in conventional frame structures of seats.

Another object of the present invention is to provide an improved frame structure of a seat, which is constructed of the minimum number of component parts, and therefore simple in construction and easy to be produced.

A further object of the present invention is to provide an improved frame structure of a seat, which is excellent from the economical view point so that the number of component parts, the weight, the production cost and the production time of the frame structure can be largely reduced as compared with those of conventional frame structures of seats.

A still further object of the present invention is to provide an improved frame structure of a seat, which can have a predetermined sufficient strength without providing an over-quality even under no reinforcement, and can be easily and speedily produced.

A still further object of the present invention is to provide an improved frame structure of a seat, which can securely support a head rest without using a holder bracket for supporting a holder that holds stays of the heat rest.

A frame structure of the present invention is for a seat and comprises a frame including an upper frame section having opposite end portions. The upper frame section is formed generally channel-shaped in section at least at a longitudinal central part thereof. The upper frame section includes an upper end wall portion formed with through-holes in which holders for stays of a head rest are to be supported. First and second side frame sections are integrally connected respectively to the opposite end portions of the upper frame section. The frame is produced from a sheet material and formed generally U-shaped (inverted). A support bracket for supporting the holders for the head rest stays is fixed to the upper frame section. The support bracket includes a support section for supporting the holders. The support section is located opposite to the upper end wall portion of the upper frame section of the frame.

With this arrangement, it is unnecessary to join the upper frame section and side frame sections by means of welding or the like, thereby reducing the number of the component parts and facilitating the production of the frame structure. The impact load from the head rest can be absorbed by the support bracket, and therefore the frame structure can sustain an impact load applied to the seat. Additionally, by virtue of the through-holes formed in the upper frame section and the support section of the support bracket, the holders for the head rest stays can be securely installed to the frame structure without using a holder bracket, which is conventionally welded to the frame structure for the purpose of supporting the holders.

BRIEF DESCRIPTION OF THE DRAWINGS

In the drawings, like reference numerals designate like elements and parts, in which.

DETAILED DESCRIPTION OF THE INVENTION

Figure 1:
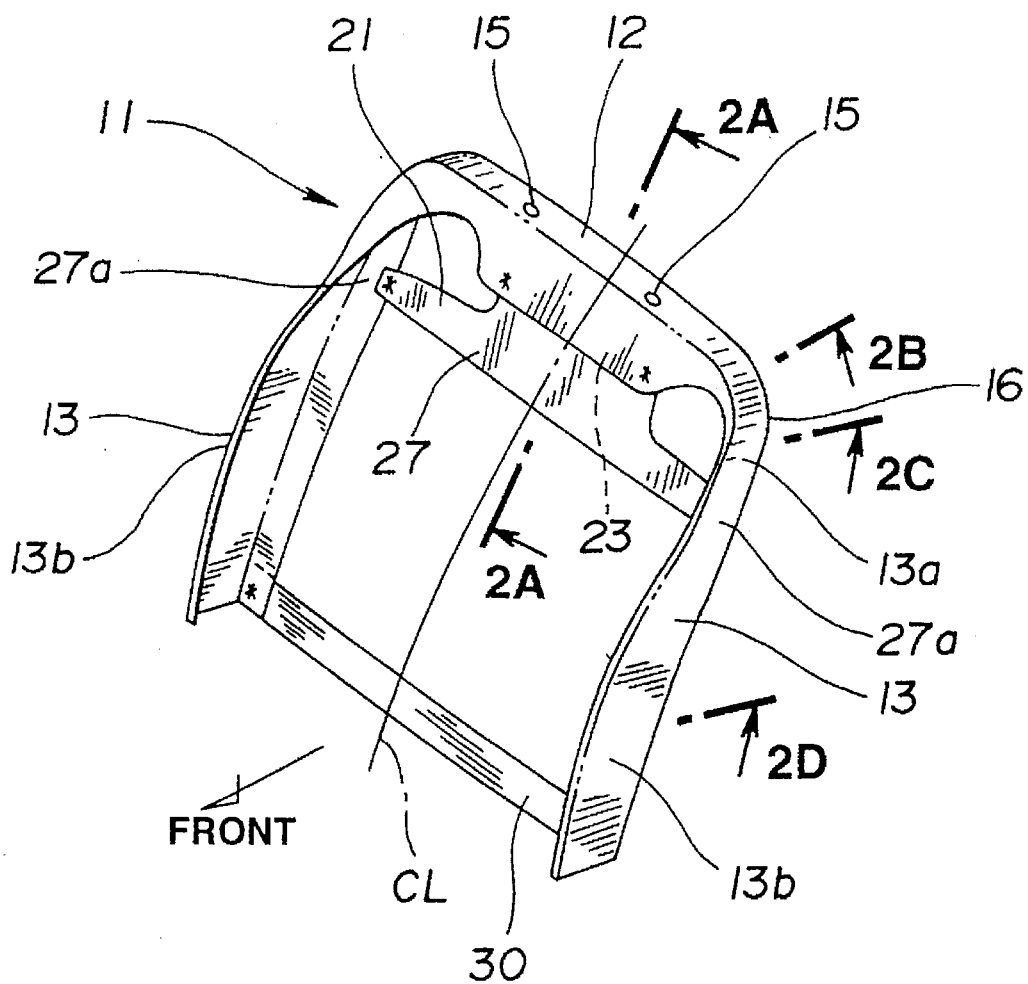
FIG. 1 is a perspective view of a first embodiment of a frame structure of a gear, according to the present invention.

Referring now to FIGS. 1 to 4, a first embodiment of a frame structure of a seat, according to the present invention is illustrated by the reference numeral 11. In this embodiment, the frame structure 11 is a back-rest frame structure to be used in a vehicular seat. The back-rest frame structure 11 forms part of a back-rest to which the back of a vehicle passenger seated on the seat (not shown) is supported. The back-rest frame structure 11 comprises a back-rest frame 11 including an upper frame section 12 and right and left side frame sections 13. The upper frame section 12 extends generally horizontal. The right and left side frame sections 13, 13 are integral at their upper end portion with the upper frame section 12 at the opposite end portions, thereby a generally U-shaped (inverted) back-rest frame 11. The back-rest frame 11 is formed integral and produced from an elongate metal panel or sheet 11' as shown in FIG. 3A.

Figure 2A:
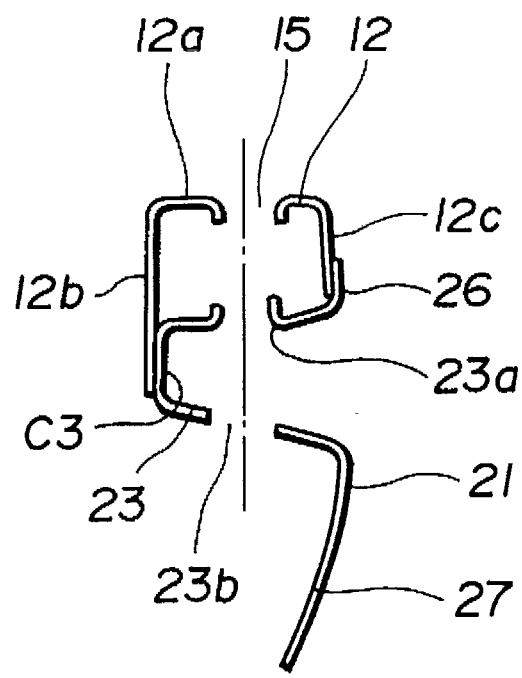
FIG. 2A is a fragmentary sectional view taken in the direction of the arrows substantially along the line 2A—2A of FIG. 1.

The upper frame section 12 is formed generally channel-shaped and has an upper end wall portion 12a, and front and rear wall portions 12b, 12c. The front and rear wall portions 12b, 12c are integral with the upper end wall portion 12a as best seen in FIG. 2A. The upper end wall 12a is formed with right and left through-holes 15, 15 in which holders (not shown) for supporting stays (not shown) of a head rest (not shown) are and inserted to be supported in position. It will be understood that the number of the through-holes 15, 15 may be more than two according to the number of the stays of the head rest.

Figure 2B:
FIG. 2B is a fragmentary sectional view taken in the direction of the arrow substantially along the line 2B of FIG. 1.
Figure 2C:
FIG. 2C is a fragmentary sectional view taken in the direction of the arrow substantially along the line 2C of FIG. 1.
Figure 2D:
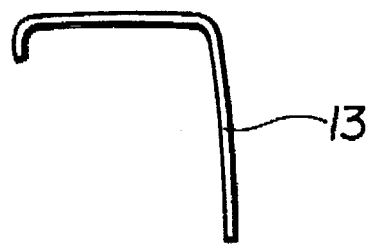
FIG. 2D is a fragmentary sectional view taken in the direction of the arrow substantially along the line 2D of FIG. 1.
Figure 3A:
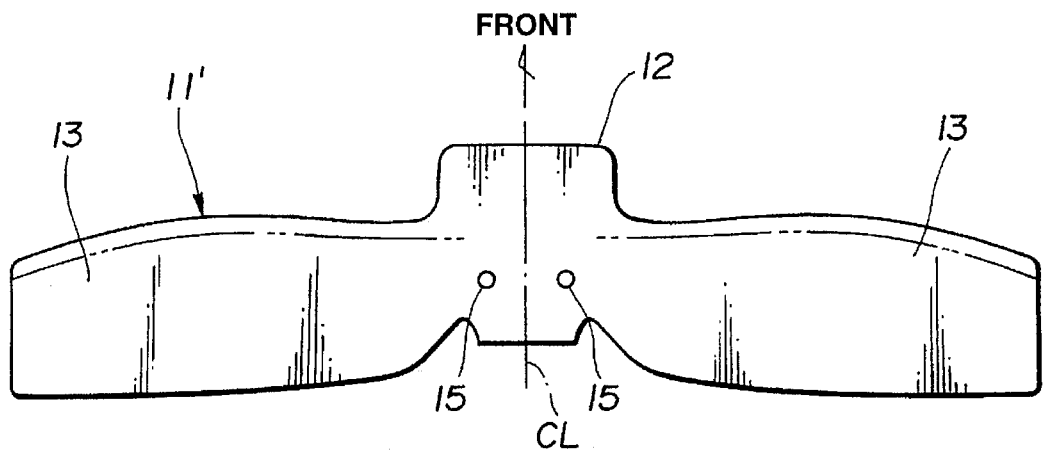
FIG. 3A is a plan view of a flat metal sheet from which a frame of the frame structure of FIG. 1 is produced.
Figure 3B:
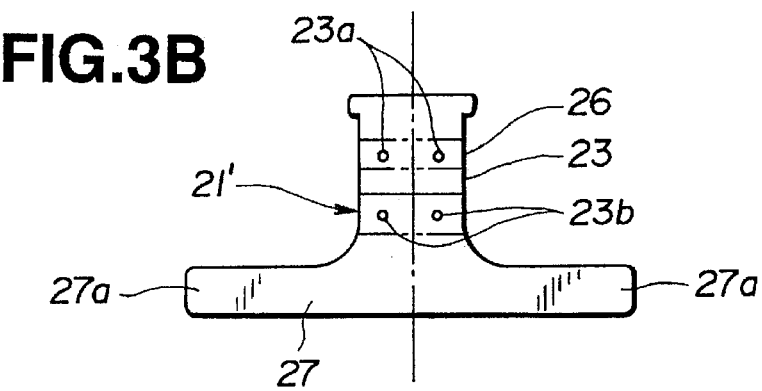
FIG. 3B is a plan view of a flat metal sheet from which a support bracket of the frame structure of FIG. 1 is produced.

Each of the opposite end portions of the upper frame section 12 and the upper end portion of each side frame section 13 are integrally connected with each other to form a corner section 16, which is formed generally cylindrical in cross-section as shown in FIG. 2B. Each side frame section 13 includes a middle portion 13b, and an upper portion 13a located between the middle portion 13b and the above-mentioned upper end portion. The upper portion 13a is formed generally C-shaped in cross-section as shown in FIG. 2C. The middle portion 13b of the side frame section 13 is formed generally L-shaped in cross-section as shown in FIG. 2D.

Each of the right and left side frames 13 is formed such that the width thereof increases in a direction toward the lower end portion thereof, and that it is gradually bent rearward in a direction toward the upper end portion thereof. The middle portion 13b of each side frame section 13, however, is not limited to the generally L-shape and may be channel-shaped or generally C-shaped in cross-section. In connection with the above-arranged back-rest frame 11, the holder to be inserted in each through-hole 15 of the upper frame section 12 usually includes a head section, a body section extending from the head section, and a wedge-shaped tip end section, (not shown). In FIG. 1, the reference characters CL denote a center line or axis of the back-rest frame 11.

Figure 4:
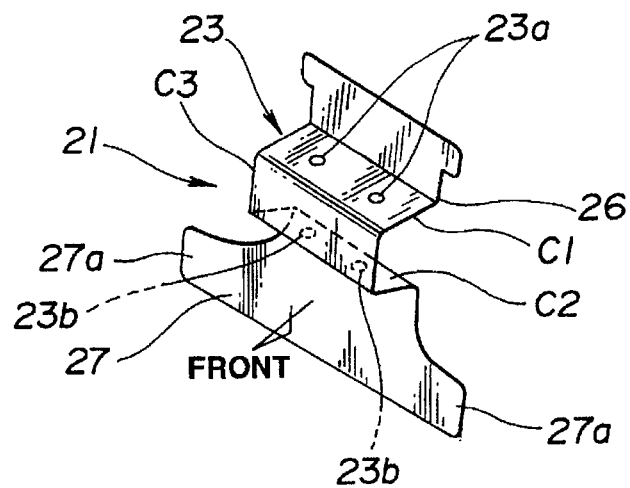
FIG. 4 is a perspective view of the support bracket formed from the flat metal sheet of FIG. 3B.

A support bracket 21 is fixed to the upper frame section 12 and to the side frame sections 13, 13 to support the holders for the stays of the head rest. The support bracket 21 is produced from a flat metal plate or sheet 21' shown in FIG. 3B. The flat metal plate 21' is formed into the shape shown in FIG. 4 by bending a vertically extending section 26 of the flat metal plate 21' along the broken lines indicated in FIG. 3B in which the flat metal plate 21' is formed in the generally T-shape (inverted). As a result, the thus formed support bracket 21 is formed with a generally channel-shaped support section 23, which projects forward. The channel-shaped support section 23 includes laterally extending flat first and second wall portions C1, C2, which are generally horizontal and parallel with each other and connected to each other through a laterally extending flat side wall portions C3. The first wall portion C1 is formed with through-holes 23a, 23a in which the stays of the head rest stays are respectively to be inserted. Similarly, the second wall portion C2 is formed with through-holes 23b, 23b in which the stays of the head rest stays are respectively to be inserted. The support bracket 21 includes a laterally extending lower end section 27 having opposite end portions 27a as shown in FIG. 4.

As illustrated in FIGS. 1 and 2A, the support bracket 21 is fixedly installed to the back-rest frame 11 as follows: The upper end portion of the vertically extending section 26 of the support bracket 21 is fixed to the rear wall portion 12c of the upper frame section 12 of the back-rest frame 11 by means of welding or the like. Additionally, the side wall portion C3 of the channel-shaped support section 23 of the support bracket 21 is fixed to the front wall portion 12b of the upper frame section 12 of the back-rest frame 11 by means of welding or the like. Accordingly, a pipe-shaped structure (no numeral) is formed by the upper frame section 12 of the back-rest frame 11 and the channel-shaped support section 23 of the support bracket 21. The opposite end portions 27a, 27a of the laterally extending lower end section 27 of the support bracket 21 are fixed respectively to the side frame sections 13, 13 of the back-rest frame 11 by means of welding or the like.

In this fixed state, the through-holes 15, 15 of the upper end wall portion 12a of the upper frame section 12 face respectively the through-holes 23a, 23a of the first wall portion C1 of the channel-shaped support section 23 of the support bracket 21. The through-holes 23a, 23a face respectively the through-holes 23b, 23b of the second wall portion C2 of the channel-shaped support section 23 of the support bracket 21. In other words, the right-side through-holes 15, 23a, 23b are aligned with each other in a manner that an imaginary straight line (indicated by a dot-dash line in FIG. 2A) passes through the centers of the through-holes 15, 23a, 23b. Similarly, the left-side through-holes 15, 23a, 23b are aligned with each other in a manner that the imaginary straight line passes through the centers of the through-holes 15, 23a, 23b. It will be understood that the holder for the head rest stay is inserted in the aligned through-holes 15, 23a, 23b. Accordingly, the laterally extending lower end section 27 of the support bracket 21 functions as a protective member for the head rest stays thereby making it possible that the head rest stays can secure a sufficient strength to stand an impact load applied to the back-rest of the seat.

As shown in FIG. 1, a lower frame section 30 is disposed such that its opposite end portions are fixed respectively to the lower end portions of the right and left side frame sections 13, 13. Additionally, a seat springs and/or a lumbar support (not shown) are disposed between the side frame sections 13, 13.

Figure 5A:
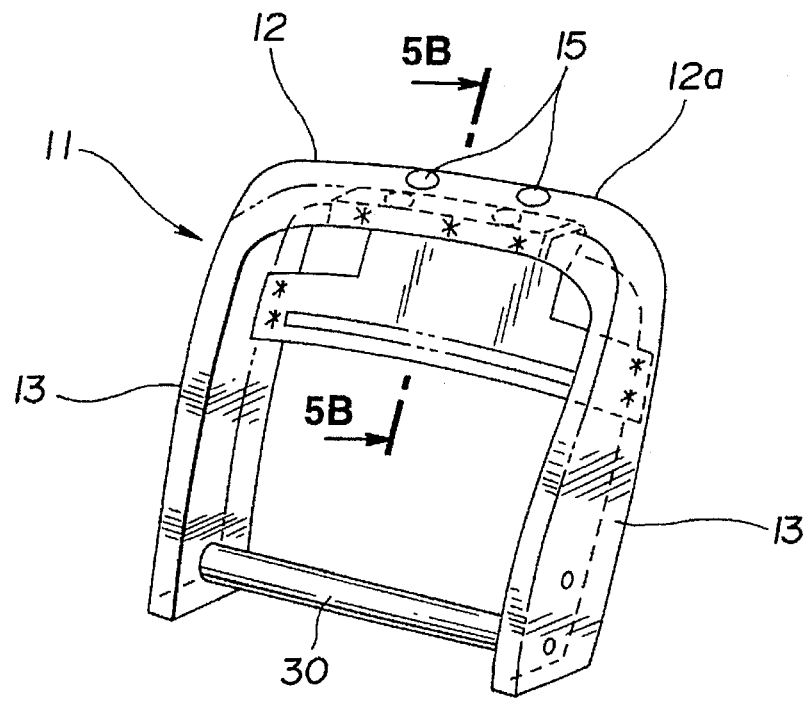
FIG. 5A is a perspective view of a second embodiment of the frame structure according to the present invention.
Figure 5B:
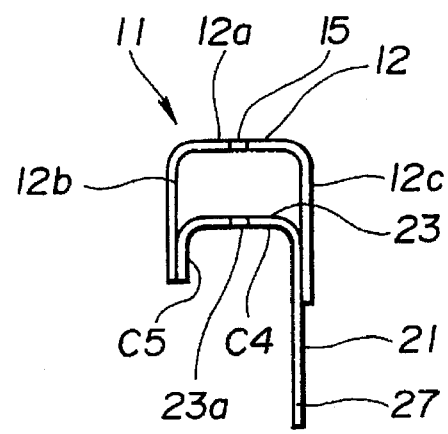
FIG. 5B is a fragmentary sectional view taken in the direction of arrows substantially along the line 5B—5B of FIG. 5A.
Figure 6:
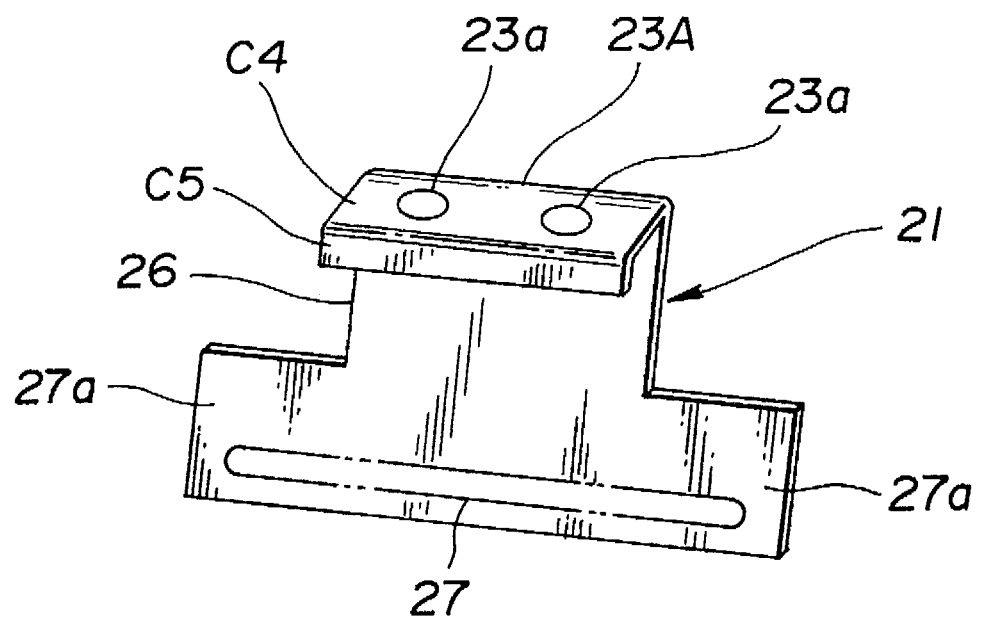
FIG. 6 is a perspective view of a support bracket of the frame structure of FIG. 5A.

FIGS. 5 and 6 illustrate a second embodiment of the frame structure (back-rest frame structure) 11 of the seat, according to the present invention, similar to that of the first embodiment of FIGS. 1 to 4. In this embodiment, the support bracket 21 is formed as shown in FIG. 6, in which the vertically extending section 26 is bent to form the support section 23 having a generally L-shaped cross-section. The support section 23A includes a laterally extending flat upper end wall portion C4, and a laterally extending flat side wall portion C5 as shown in FIG. 6.

As shown in FIGS. 5A and 5B, the upper end wall C4 is formed with through-holes 23a, 23a in which the holders for the head rest stays are respectively to be inserted. The support bracket 21 includes the laterally extending lower end section 27 having the opposite end portions 27a as shown in FIG. 6.

As illustrated in FIG. 5, the support bracket 21 is fixedly installed to the back-rest frame 11 as follows: The channel-shaped support section 23A is disposed inside the upper frame section 12 and fixed in position. More specifically, the side wall portion C5 is fixed to the front end wall portion 12b. The lower part of the vertically extending section 26 of the support bracket 21 is fixed to the rear wall portion 12c of the upper frame section 12 of the back-rest frame 11 by means of welding or the like. Accordingly, a pipe-shaped structure (no numeral) is formed by the upper frame section 12 of the back-rest frame 11 and the support section 23A of the support bracket 21. The opposite end portions 27a, 27a of the laterally extending lower end section 27 of the support bracket 21 are fixed respectively to the side frame sections 13, 13 of the back-rest frame 11 by means of welding or the like. In this fixed state, the through-holes 15, 15 of the upper end wall portion 12a of the upper frame section 12 face respectively the through-holes 23a, 23a of the wall portion C4 of the channel-shaped section 23 of the support bracket 21. In other words, the right-side through-holes 15, 23a are aligned with each other in a manner that an imaginary straight line (not shown) passes through the centers of the through-holes 15, 23a. Similarly, the left-side through-holes 15, 23a are aligned with each other in a manner that the imaginary straight line passes through the centers of the through-holes 15, 23a.

Figure 7A:
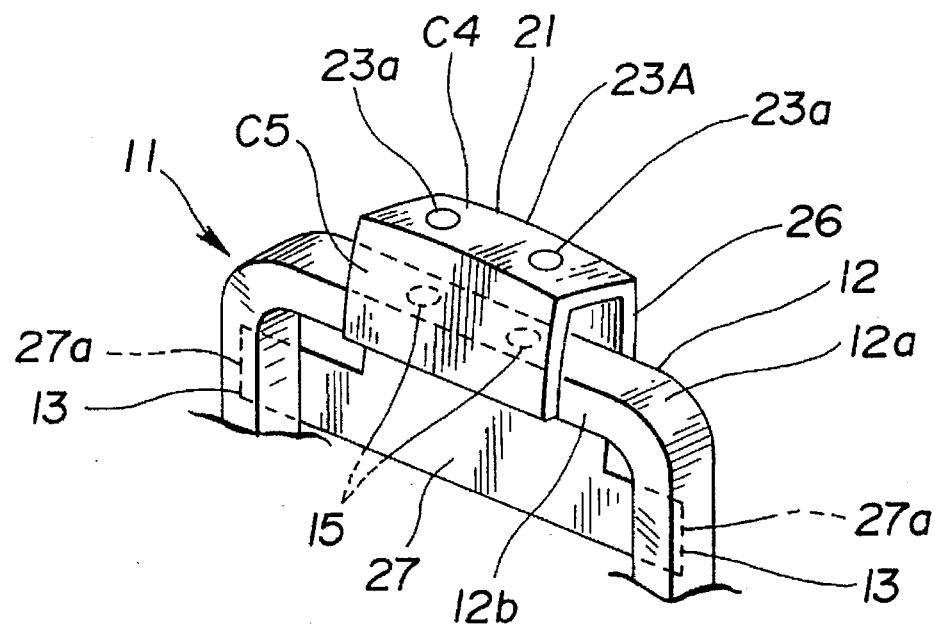
FIG. 7A is a fragmentary perspective view of a modified example of the second embodiment frame structure of FIG. 5A.
Figure 7B:
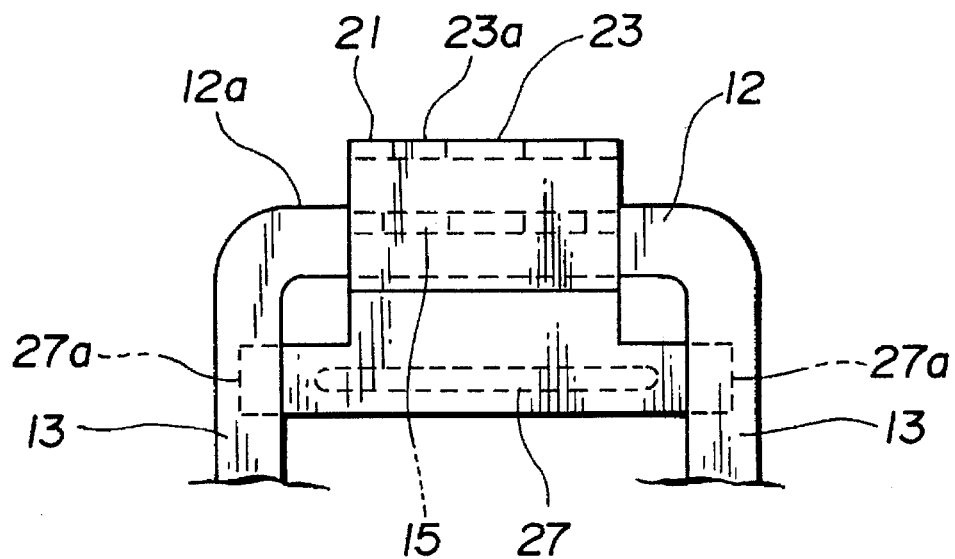
FIG. 7B is a fragmentary front elevation of the frame structure of FIG. 7A.

FIGS. 7A and 7B show a modified example of the second embodiment of the frame structure (back-rest frame structure) 11 of FIGS. 5A, 5B and 6. In this example, the support section 23 of the support bracket 21 is similar to that shown in FIG. 6 with the exception that the flat wall portions C4, C5 are formed large in width as compared with those in the embodiment of FIG. 6. In this example, the support section 23 is mounted over the upper frame section 12 and fixed in position in such a manner that the flat wall portion C5 and the lower part of the section 26 are fixed respectively to the wall portions 12b, 12c the rear wall portion 12c of the upper frame section 12 by means of welding or the like. Accordingly, a pipe-shaped structure (no numeral) is formed by the upper frame section 12 of the back-rest frame 11 and the support section 23A of the support bracket 21.

Figure 8A:
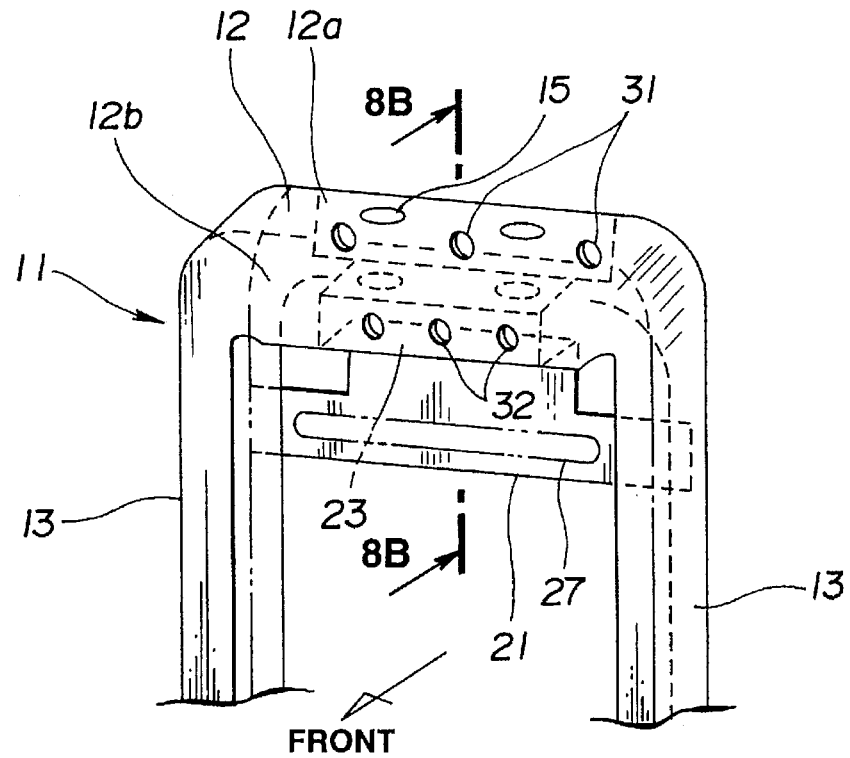
FIG. 8A is a fragmentary perspective view of a third embodiment of the frame structure according to the present invention.
Figure 8B:
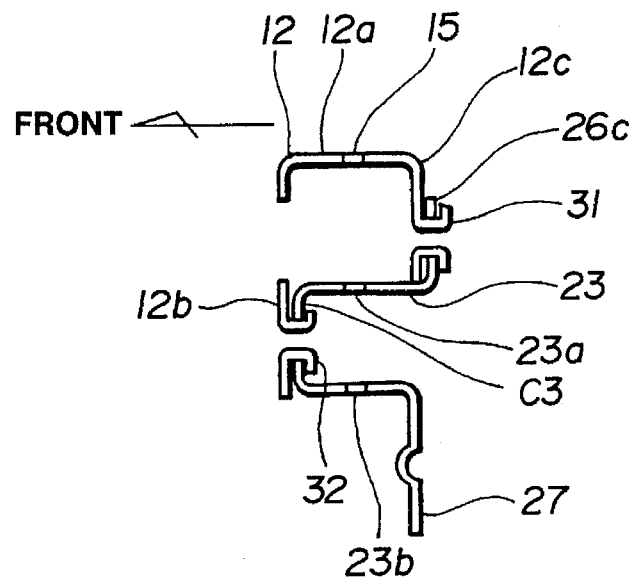
FIG. 8B is a vertical sectional view taken in the direction of arrows substantially along the line 8B—8B of FIG. 8A.

FIGS. 8A and 8B illustrate a third embodiment of the frame structure (back-rest frame structure) 11 similar to that of the first embodiment of FIGS. 1 to 4. In this embodiment, the support section 23 is fixed in position in such a manner that the flat wall portions C3 and the upper portion 26c of the vertically extending section 26 are fixed respectively to the wall portions 12b, 12c of the upper frame section 12 by means of burring caulking or welding.

Also in this embodiment, the support bracket 21 is produced from a flat metal plate or sheet (corresponding to that denoted by 21' in FIG. 3B) and produced by bending a vertically extending section (corresponding to that denoted by 26 in FIG. 3B) of the flat metal plate so that the flat metal plate is formed in the generally T-shape which is turned upside down. The opposite end portions 27a, 27a of the laterally extending lower end section 27 of the support bracket 21 are fixed respectively to the side frame sections 13, 13 of the back-rest frame 11 by means of welding or the like. Also in this embodiment, the holder for the head rest stay is to be inserted in the aligned through-holes 15, 23a, 23b. Accordingly, the laterally extending lower end section 27 of the support bracket 21 functions as a protective member for the head rest stays thereby making it possible that the head rest stays can secure a sufficient strength to stand an impact load applied to the back-rest of the seat, similarly to the first embodiment of FIGS. 1 to 4.

In the above-discussed third embodiment back-rest frame structure 11, by virtue of using the burring caulking 31, 32 or the like, the support section 23 of the support bracket 21 can be set from the side of the rear wall portion 12c of the upper frame section 12 and assembled to the upper frame section 12, thereby improving an assembly-operational efficiency of the back-rest frame structure 11.

Figure 9A:
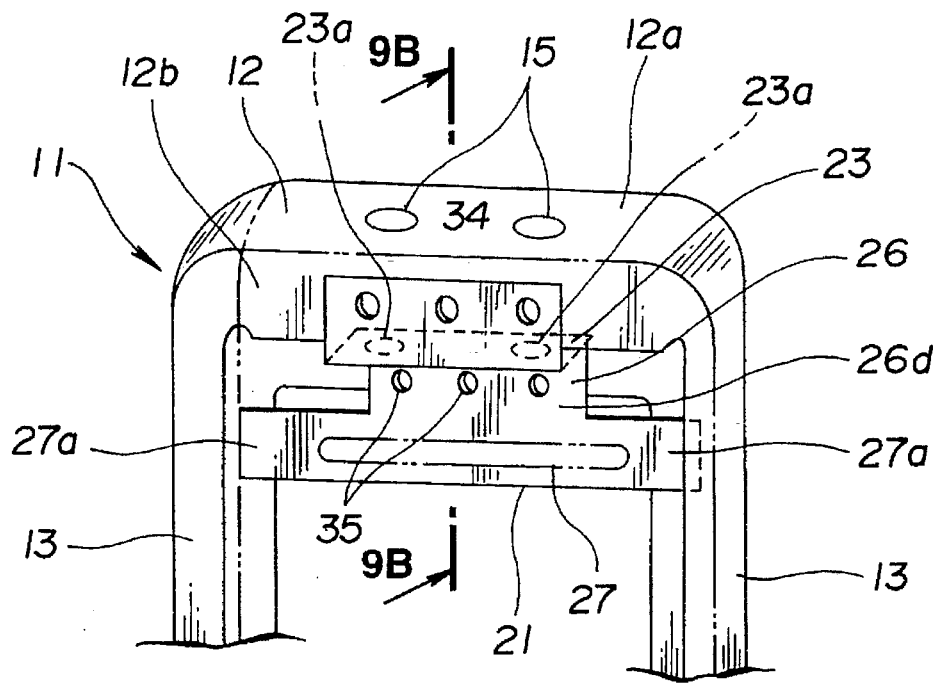
FIG. 9A is a fragmentary perspective view of a fourth embodiment of the frame structure according to the present invention.
Figure 9B:
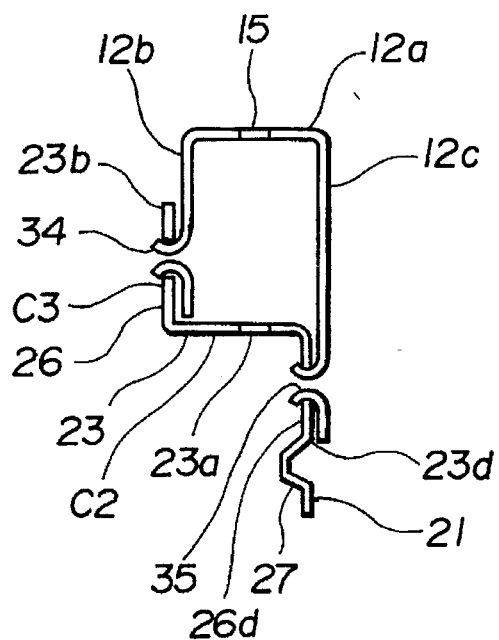
FIG. 9B is a vertical sectional view taken in the direction of arrows substantially along the line 9B—9B of FIG. 9A.

FIGS. 9A and 9B illustrate a fourth embodiment of the frame structure (back-rest frame structure) 11 similar to that of the third embodiment of FIGS. 8A and 8B. In this embodiment, the support bracket 21 is formed with the support section 23 that is generally L-shaped in cross-section and projects forward. The support section 23 includes laterally extending flat wall portions C2, and the laterally extending flat side wall portions C3. The flat wall portion C2 is formed with through-holes 23a, 23a. In this embodiment, the rear wall portion 12c is formed larger in width than the front wall portion 12b.

The support section 23 is fixedly installed in position in such a manner that the vertical wall portion C3 and the lower portion 26d of the vertically extending section 26 are fixed respectively to the wall portions 12b, 12c of the upper frame section 12 by means of burring caulking or welding.

Also in this embodiment, the support bracket 21 is produced from a flat metal plate or sheet (similar to that denoted by 21' in FIG. 3B) and produced by bending the vertically extending section 26 of the flat metal plate so that the flat metal plate is formed in the generally T-shape (inverted). The opposite end portions 27a, 27a of the laterally extending lower end section 27 of the support bracket 21 are fixed respectively to the side frame sections 13, 13 of the back-rest frame 11 by means of welding or the like. Also in this embodiment, the holder of the head rest stay is to be inserted in the aligned through-holes 15, 23a, 23b.

In the above-discussed fourth embodiment back-rest frame structure 11, by virtue of using the burring caulking 31, 32 or the like, the support section 23 of the support bracket 21 can be set from the side of the front wall portion 12c of the upper frame section 12 and assembled to the upper frame section 12, thereby improving an assembly-operational efficiency of the back-rest frame structure 11.

While only the back-rest frames for the vehicular seats have been shown and described as the embodiments of the present invention, it will be understood that the principle of the present invention may be applicable to a variety of frames of seats.

What is claimed is:

1. A frame structure for a seat, comprising:

a frame including an upper frame section having opposite end portions and a generally channel-shaped central section, said channel-shaped section having an upper end wall portion with through-holes adapted for receipt of holders for stays of a head rest, and first and second side frame sections integrally connected respectively to the opposite end portions of said upper frame section; and a support bracket adapted for supporting the holders for the head rest stays, fixed to said upper frame section, said support bracket including a channel-shaped support section adapted for supporting the holders, said channel-shaped support section including a first wall portion located opposite to said upper end wall portion of said upper frame section, said first wall portion being formed with through-holes adapted for supporting the holders for the head rest stays, said through-holes of said support section being located opposite to said through-holes of said upper end wall portion of said upper frame section, wherein said channel-shaped section of said upper frame and said first wall portion of said channel-shaped support section form a substantially tubular structure, wherein said channel-shaped support section extends substantially parallel with said channel-shaped section of said upper frame, and wherein said support bracket has laterally extending sections, ends of said laterally extending sections being fixed respectively to said first and second side frame sections.

2. A frame structure as claimed in claim 1, wherein said frame is formed of a metal sheet, wherein said channel-shaped support section of said support bracket is formed of a flat T-shaped metal sheet, which includes a vertically extending section, said channel-shaped support section of said support bracket being formed by bending said vertically extending section of said flat metal sheet.

3. A frame structure as claimed in claim 1, wherein said frame has a generally inverted U-shape.

* * * * *